Patented Feb. 1, 1938

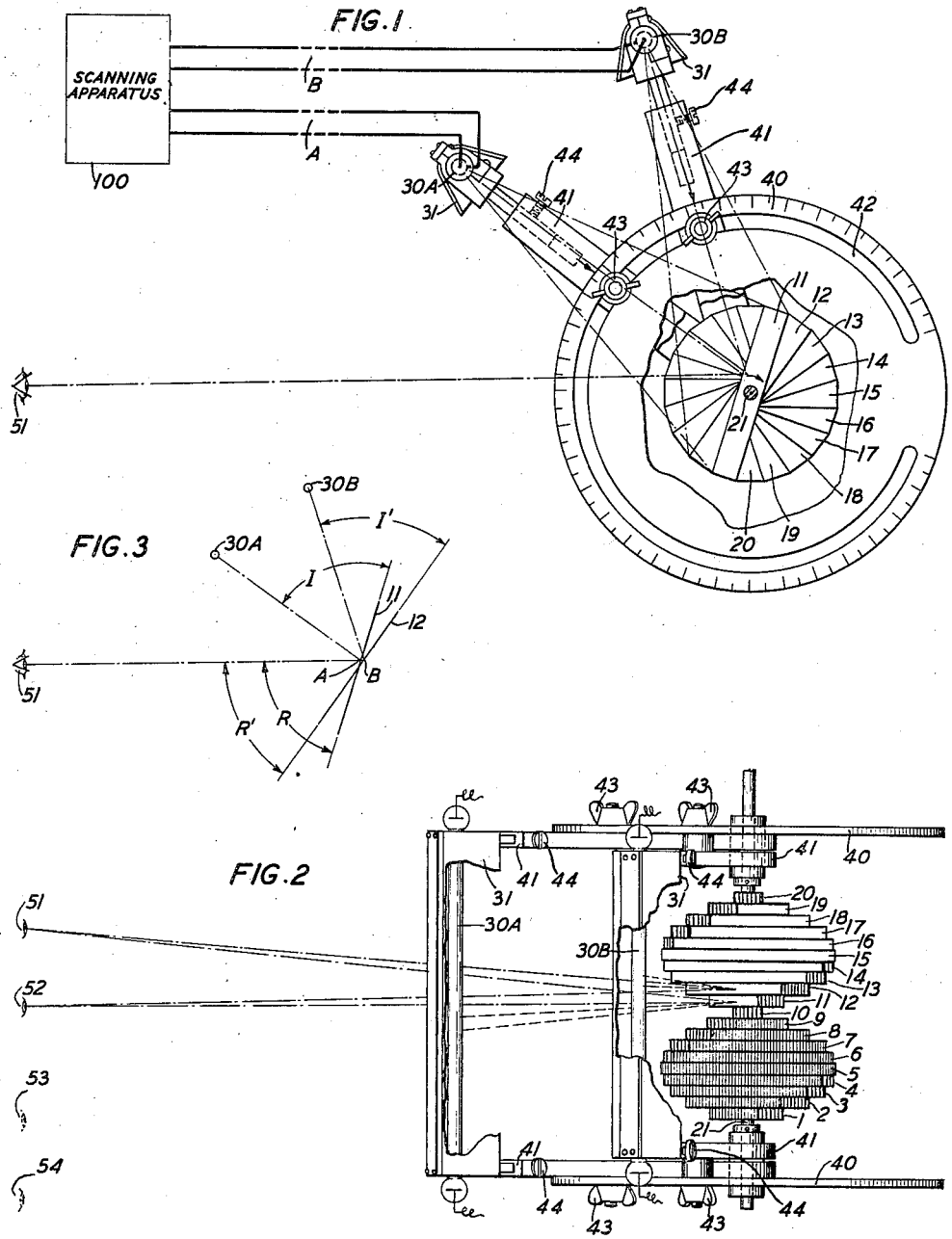

2,107,153

UNITED STATES PATENT OFFICE 2,107,153

MULTIPLE CHANNEL ELECTRO-OPTICAL IMAGE PRODUCTION USING MIRROR HELIX

Herbert E. Ives, Montclair, N. J., assignor to Bell Telephone Laboratories, Incorporated, New York, N. Y., a corporation of New York Application December 1, 1934, Serial No. 755,572

12 Claims. (Cl. 178—7.3)

This invention relates to multiple channel electro-optical image producing means and more particularly to a method and means of producing a multiple channel image by a mirror helix scanning element.

An object of this invention is the adaptation of the mirror helix to multiple channel image production.

Another object of this invention is to make possible the scanning of the elemental strips across the image field in any desired prearranged sequence, that is, with any desired prearranged displacements of the corresponding scanning lines of the several channels, thus controlling the nature of the geometric distortion due to motion of the object.

In accordance with this invention, the brightness or the size of the produced image or both may be increased over that obtainable with the ordinary mirror helix arrangement, and automatic compensation for line level variations may be achieved by having each channel scan the entire image field.

In the prior art, mirror helices have been employed in single channel electro-optical systems. In such systems the mirror helix produces a plurality of images simultaneously, but such images appear at different angular positions and are all produced from the same light source. In multiple channel operation a separate light source is employed for each channel and each light source produces a complete separate image so positioned that each of the several images produced by the different light sources are simultaneously present and superimposed within the viewing field.

With a mirror helix image producing device employing a single linear light source spaced from it and positioned parallel with the axis of the helix, as the eye of the observer is moved in the direction at right angles to the axis of the helix, the image repeats itself in a series of positions, but if the eye is kept stationary and two or more light sources are used and placed at the proper positions, one light source will be seen in the first mirror or reflecting surface of the helix and a second light souce in the second mirror.

For example, with two light sources the simultaneously produced images of these sources may be in juxtapositioned scanning lines. Geometrical distortion due to motion of the object will then simulate that of a single channel system. The two images may be either in line with each other at each instant in a direction parallel to the axis of the helix or they may be widely out of line with each other. In the former case, the lamps must be spaced around the helix with an angular displacement approximately twice that of the mirror strip displacement. This particular arrangement, which has been chosen for illustration in the drawing, is of course a special case of the use of more than one linear light source of the mirror helix in multi-channel operation. The possible variations in the positions of the linear light sources in a cylindrical disposition about the axis of a mirror helix are only limited by the mechanical bars to the closeness of possible juxtaposition at one extreme, and by the fact that as the linear sources take up positions more and more away from the space between the observer and the helix, the projected area of the helix strip which reflects them becomes smaller.

The multiple channel arrangement here disclosed belongs in a general class of multiple channel arrangements in which each channel shows on every elemental image strip at some time. Perhaps the easiest way to picture this kind of multiple channel arrangement is to imagine the pick-up scanning to be done by a scanning disc. In this disc there can be placed one or more spirals of apertures, and if these spirals are the same except for differences of starting point on the disc, or phase, it is readily seen that every elemental image strip will be traversed by beams of light passing through the spirals in succession. The times of passage will, however, depend on the phases of the spirals. The light picked up by the apertures in the various spirals is, of course, sent to separate photoelectric cells for each spiral as, for instance, by means of prisms over the scanning apertures.

Assuming now a pick-up scanning arrangement of the sort just described, what is needed at the receiving end is a system of light sources each capable of being picked-up by the elemental image strips in succession, these light sources being capable of phase displacements to match those in the sending system. Now the linear light sources disposed on a cylinder coaxial with the axis of the mirror helix and at such a distance therefrom with respect to the angle between the mirror strips that each mirror strip picks up a given light source immediately after the preceding one loses it, becomes a system of the sort desired by moving the linear light sources parallel to themselves over the cylindrical surface until the projected images of the object field formed by the different light sources coincide.

A more detailed description of the embodiment chosen for illustrating this invention follows:

Fig. 1 is a diagrammatic elevational view of the apparatus, part of which is broken away to show another portion;

Fig. 2 is a plan view of the apparatus shown in Fig. 1; and

Fig. 3 is an optical diagram showing the action at a given instant of the respective light beams from two light sources reaching an observer.

Referring to the drawing, incoming image currents for each channel modulated in accordance with the tone values of successive elemental areas of elemental strips of a field of view at the transmitting station are impressed upon respective strip light sources 30A and 30B, channels A and B, respectively cooperating with the sources 30A and 30B. Two channels are here shown but, as heretofore stated, a larger number of channels may be employed. For the particular setting of the lamps as illustrated, there would be a phase difference in the two currents, corresponding to the time required to scan one complete elemental line. The strip light sources are adjustably supported at their ends, respectively, by suitable members such as arms 41 which are mounted so as to maintain the light sources parallel to the axis of the mirror helix in definite angular positions and at the proper radial distances. Means are provided at each end of the helix for locking the arms 41 in any desired angular position. The angular locking arrangement may consist of two stationary disc like supports 40 each having a circular slot 42 through which a clamping bolt 43 attached to an arm 41 passes, and, upon being tightened, clamps the arm 41 in any desired angular position rigidly to its stationary support 40. The stationary supports 40 may be angularly graduated and a mark on each of the arms, or even a vernier if great accuracy is desired, may be employed to indicate the relative angular position and setting of the arms 41 to enable the strip light sources to be suitably angularly positioned around the mirror helix. The length of the arms 41 may be changed to position the light sources at different distances from the helix. This may be accomplished by any suitable means such as making the arms in two pieces telescoping with each other and providing a locking means for the two parts, such as a set screw 44. An opaque shield 31 or coating directly on the lamps is associated with each of the light sources to prevent light from directly reaching the observer's eye and to properly shield the sources from otherwise sending out light in undesired directions. In the practical application of this arrangement, the ready and accurate adjusting means for positioning the light sources in any desired position is an important feature both to obtain the best operating capabilities of the device and also to permit its adaptation to different types of scanning arrangements so that the incoming signals received over the different channels produce superimposed images and permit the control of the geometric distortion heretofore referred to. The helix may comprise any number of reflecting strips but, as here shown, it is made up of rectangular strips 1 to 20 rigidly supported upon shaft 21 and progressively angularly displaced, strips 11 to 20 and strips 1 to 20 being shown in Figs. 1 and 2, respectively. One edge of each strip is highly polished and made reflecting while the remaining edges are blackened or otherwise prevented from reflecting light, as shown in Fig. 2, wherein the blackened edges are shown by shading.

When the mirror helix is rotated, the reflecting surface of the helix strips will reflect light from different small portions of each of the lamps 30A and 30B to the two eyes 51, 52, 53, 54, etc. of each observer. The light thus reflected to each eye is made up of successive small portions of two large diverging beams of light which are swept across the eye as the surface from which the beams are reflected is rotated. The observer thus sees each lamp as if the reflecting surfaces were narrow vertical slits through which he looks at the lamps in the rear thereof, the lamps apparently moving upwardly as the mirror helix rotates in the direction indicated by the arrow.

Fig. 3 is an optical diagram showing more in detail the paths of the respective light rays from two strip light sources impinging upon two reflecting surfaces of a mirror helix at a given instant and their simultaneous reflection of the light representative of two elemental areas of an image into the eyes of an observer. Light from these sources is, of course, reflected from other parts of these two reflecting strips and also from the other strips, but only the rays reaching the eyes of an observer are shown in this diagram. The pupil of the eye forms an aperture which limits and defines the useful light at any instant for a given observer. In accordance with the general law of reflection, all rays emanating from a point and falling upon a plane mirror have, after reflection, the same direction as if they came from a point symmetrically situated with respect to the mirror to its rear, which point is where the virtual image is formed. It lies on a perpendicular to the mirror through the object point and as far behind the mirror as the object point is in front thereof. The plane of the incident and reflected rays contain the normal or perpendicular. However, for the sake of simplicity, the two virtual image points are not shown. In the diagrammatic showing of Fig. 3 one of these points lies directly underneath the other. Since the two reflecting strips 11 and 12 have different angular positions, the effective points or areas A and B on the two strips, respectively, have different positions as shown in the diagram and, as already stated, these points may lie on adjacent mirror strips and in the same horizontal line as in the example shown in this diagram, or they may be more or less separated both vertically and horizontally depending upon the relative angular spacing of the mirror helix strips and the angular spacing between the lamps themselves. The parts of the apparatus shown in this diagram are the reflecting surfaces of the mirror strips 11 and 12 of the helix and the two strip light sources 30A and 30B. A narrow reflected beam from each source enters the eye of the observer 51. The observer sees at any instant a small illuminated area on each of the two reflecting strips, one from each light source or, in other words, a short section of each of the light sources. The angle of reflection R is always equal to the angle of incidence I. In the diagram, reflecting strip 11 is reflecting an image of a short section of light source 30A to the eye of the observer 51 and the angle of reflection R is equal to the angle of incidence I, while the mirror helix reflecting strip 12 is reflecting an image of a short section of light source 30B and the angle of reflection R' is equal to the angle of incidence I'. The light reflected at a given instant from light source 30A by mirror strip 11 into the eyes of the observer is reflected from the region A of this mirror strip, while light reflected from the light source 30B by mirror strip 12 to the eyes of the observer is reflected from the region B of this mirror strip. As the mirror helix rotates, the effective regions A and B on the reflecting strips move rapidly along the strips and in succession over the strips of the entire mirror helix thus rapidly scanning the entire image field, as many scanning beams being simultaneously projected into each eye of an observer as there are channels simultaneously operating.

As the two moving bright spots (images of sections of the two sources) simultaneously in action pass from view, a similar but laterally displaced pair appears approximately simultaneously at the bottom of the field, and then move upwardly side by side as the result of the reflection from two adjacent reflecting surfaces. This process is repeated for each pair of the reflecting surfaces in succession to simultaneously form two complete superimposed images during each revolution of the helix, and within a period approximating that of the persistence of vision, the helix making one revolution within this period.

However, if the spacing of the two elemental areas being simultaneously scanned is equal to half the width of the image field, the speed of the helix may be cut in half, since each half of the image field would still be scanned within the period of the persistence of vision. This might even be carried further by dividing the field of view into three equal parts and reducing the speed of rotation of the helix to one-third of that required where the several elemental areas are necessarily in juxtapositioned elemental line strips. With three divisions, three strip light sources are employed and three transmission channels, one for each lamp or set of signals.

As heretofore stated, the scanning mechanism at the transmitting station may be of any suitable type which scans the field of view in a series of parallel strips in the same sequence as at the receiving station. A scanning system may be used at the transmitting station similar to that disclosed in the patent of O. B. Blackwell and J. Herman, No. 2,101,976, dated Dec. 14, 1937, or similar to that disclosed in the patent of F. Gray, No. 2,063,998, dated Dec. 15, 1936.

The eyes of the observers at the receiving stations are so positioned that as the effective diverging beams simultaneously reflected from two reflecting surfaces complete their sweep across the eyes, the beams from the next set of mirror strips reach the position of the eyes and begin sweeping across them. The light sources must be of such length that the width of each of the reflected beams will be great enough, in a direction parallel with the horizontal axis of the helix, to embrace the eyes within the beam. This necessitates the use of light sources of considerably greater length than that of the mirror helix. If the light sources are of considerable length, a plurality of observers may simultaneously view the image as indicated by the several pairs of eyes 51, 52 and 53, 54 in Fig. 2. The latitude of the viewing positions of the observers is about the same as for single channel mirror helix receivers.

The relative angular positioning of the strip light sources, as already stated, determines where or from which reflecting strip the particular elemental area on the helix from a given light source appears to the observer. In one very special case wherein the elemental areas appear in line on successive juxtapositioned reflecting strips of the helix, the angular displacement between successive light sources is twice that of the angular displacement of the mirror helix strips. In operating a three-channel system with such angular spacing of the light sources, the three spots of light, one from each source appearing at any instance, would lie in a horizontal line and together would have a dimension along this line equal to the total width of three elemental strips of the image. By increasing slightly the angular displacement of the strip light sources the three spots may be positioned in successively juxtapositioned elemental scanning lines one-third, two-thirds and three-thirds the distance across the field of view. If the angular displacement of the light sources is further increased, the elemental areas being scanned at any instant are not in successively juxtapositioned scanning lines on the field of view. This displacement may also be decreased, making the elemental areas appear in the same scanning line at a given instant. However, in all arrangements, the positioning of the strip light sources must be such as to correspond with the sequence of operation of the scanning process employed in generating the photoelectric current for each channel, or vice versa.

As stated above, the supporting arms 41 are preferably adjustable in length, as shown. This feature has two advantages. It permits the several sources to be displaced by the same amount toward or away from the helix to provide for latitude in the viewing position and also permits the sources when desired to be at somewhat different distances from the helix. This permits an adjustment to be made to largely compensate for any optical aberration of the helix which may come into play. That slight abberation may be present is clear when it is understood that the best viewing positions for a given arrangement of helix and light source lie not on a cylindrical surface concentric with the helix axis, but on a surface which departs somewhat from a true cylinder even in the region from which the helix is ordinarily viewed.

What is claimed is:

1. In combination, a mirror helix scanning device, a plurality of strip sources of light simultaneously energized by image currents, and means for positioning said helix and said sources for causing the production of a plurality of mutually superimposed complete images.

2. In an electro-optical system, a rotatable mirror helix scanning element, a plurality of strip sources of light associated with said helix and so related therewith that a series of parallel strips of a field of view are scanned in succession by each source, each strip of said field comprising a series of elemental areas, a strip of the field for each source being substantially superimposed upon the corresponding strip of the other source or sources, and the scanning by all sources being concurrent.

3. In combination with a mirror helix image producing device, a plurality of strip sources of light, each simultaneously producing the light tones of mutually superimposed complete images, and means for making the speed of rotation of the said helix proportional to the number of said images concurrently being produced.

4. In combination with a mirror helix image producing device, a plurality of strip light sources simultaneously energized and each producing the light tones of mutually superimposed separate complete images, means for producing each of said images in a time greater than the period of the persistence of vision, and means for causing the observer of said images to see a resultant complete image within the period of the persistence of vision.

5. A multiple channel electro-optical scanning device comprising a mirror helix, a plurality of strip light sources spaced apart and simultaneously energized, means for relating said helix and said sources for producing a plurality of mutually superimposed complete images by a corresponding plurality of scanning operations of each of said channels, and means for adjusting the time displacement between said corresponding scanning operations of said different channels.

6. A multiple channel electro-optical scanning device comprising a mirror helix, a plurality of strip light elements, and means for positioning said elements at a distance from said helix and parallel to its axis and with such angular displacement that the complete image fields corresponding to said elements are substantially superimposed.

7. A multiple channel electro-optical image producing scanning device comprising a mirror helix, a plurality of strip light sources, and means for positioning said sources at a distance from said helix and parallel to its axis and with such angular displacement that the complete images produced by the several light sources are substantially superimposed.

8. A multiple channel electro-optical image producing scanning means comprising a mirror helix, a plurality of strip light sources, and means for positioning and holding stationary said light sources around the said helix at a distance therefrom and with a relative angular displacement equal to approximately twice that of the angular displacement of the mirror strips in said helix.

9. A multiple channel electro-optical image producing system comprising a mirror helix, a plurality of strip light sources, and means for positioning and holding stationary said light sources around said helix at a distance therefrom and with a relative angular displacement equal to a multiple of the angular displacement of the mirror strips in said helix.

10. A multiple channel electro-optical image producing scanning means comprising a mirror helix, a plurality of strip light sources, and means for positioning said light sources around said helix and spaced therefrom in such angular positions that when the helix is viewed from a given position the incident light received from the different respective light sources is reflected from the different reflecting surfaces of said helix in the same plane and the plurality of spots of light observed at any instant are in longitudinal alignment parallel with the axis of the helix and rapidly moving over the image field of the helix.

11. In a multiple channel electro-optical system, a rotatable mirror helix scanning element, a plurality of strip light sources associated with said helix and so related therewith that a series of parallel strips of a field of view are scanned in succession by each channel, each strip of said field comprising a series of elemental areas, the strips of the field scanned by each channel being successively substantially superimposed upon the corresponding strips scanned by the other channel or channels, the scannings of all channels being concurrent and the time of beginning of the scanning of each strip being different from that of an adjacent strip by the same amount.

12. A multiple channel electro-optical system comprising a mirror helix for simultaneously scanning a plurality of series of parallel strips of a field of view in succession and in the order of their occurrence across the field, each strip comprising a series of elemental areas, the time of beginning of the scanning of each strip being different from that of an adjacent strip by the same amount and which is less than the line scanning period, and means for causing an image of the entire field to be transmitted over each of the different channels concurrently.

HERBERT E. IVES.